United States Patent [19]
Daniels, III

[11] Patent Number: 5,679,084
[45] Date of Patent: Oct. 21, 1997

[54] MOTORCYCLE ROLLER CHAIN GUIDE

[76] Inventor: Vernon James Daniels, III, 18473 NC 55 Hwy., Merritt, N.C. 28556

[21] Appl. No.: 642,949

[22] Filed: May 6, 1996

[51] Int. Cl.⁶ .................................................. F16H 7/18
[52] U.S. Cl. .................................................. 474/140
[58] Field of Search .......................... 474/91, 111, 135, 474/140, 109

[56] References Cited

U.S. PATENT DOCUMENTS 3,838,606  10/1974  Scalise .................................. 474/111
4,036,069  7/1977   Clark ..................................... 474/135
4,069,719  1/1978   Cancilla ............................. 474/135 X
4,299,582  11/1981  Leitner ............................... 474/111 X

*Primary Examiner*—Roger J. Schoeppel

[57] ABSTRACT

A motorcycle roller chain guide including a mounting block. A pair of side plates are securable to the mounting block. A pair of rollers each are positioned between the pair of side plates. The pair of rollers serve to engage a motorcycle to aid in powering a rear wheel of the motorcycle.

1 Claim, 4 Drawing Sheets

MOTORCYCLE ROLLER CHAIN GUIDE

BACKGROUND OF THE INVENTION

1. Field of the Invention

The present invention relates to a motorcycle roller chain guide and more particularly pertains to allowing a chain of a motorcycle to roll to provide more power to a rear wheel thereof with a motorcycle roller chain guide.

2. Description of the Prior Art

The use of tensioning devices is known in the prior art. More specifically, tensioning devices heretofore devised and utilized for the purpose of limiting shifting of a chain are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,036,069 to Clark discloses a motorcycle chain guide and tensioner.

U.S. Pat. No. 5,282,517 to Prince discloses a drive wheel suspension system for a motorcycle.

U.S. Pat. No. Design 247,906 to Erl discloses the ornamental design for a tensioning device for motorcycle drive chain.

U.S. Pat. No. 4,511,348 to Witdoek et al. discloses a drive tensioning apparatus.

U.S. Pat. No. 4,299,582 to Leitner discloses a chain drive for motorcycle rear wheels carried by swing arms.

U.S. Pat. No. 4,705,494 to Gibson discloses a motorcycle chain drive.

While these devices fulfill their respective, particular objective and requirements, the aforementioned patents do not describe a motorcycle roller chain guide for allowing a chain of a motorcycle to roll to provide more power to a rear wheel thereof.

In this respect, the motorcycle roller chain guide according to the present invention substantially departs from the conventional concepts and designs of the prior art, and in doing so provides an apparatus primarily developed for the purpose of allowing a chain of a motorcycle to roll to provide more power to a rear wheel thereof.

Therefore, it can be appreciated that there exists a continuing need for new and improved motorcycle roller chain guide which can be used for allowing a chain of a motorcycle to roll to provide more power to a rear wheel thereof. In this regard, the present invention substantially fulfills this need.

SUMMARY OF THE INVENTION

In the view of the foregoing disadvantages inherent in the known types of tensioning devices now present in the prior art, the present invention provides an improved motorcycle roller chain guide. As such, the general purpose of the present invention, which will be described subsequently in greater detail, is to provide a new and improved motorcycle roller chain guide and method which has all the advantages of the prior art and none of the disadvantages.

To attain this, the present invention essentially comprises a mounting block. The device includes a pair of side plates comprised of an inner plate and an outer plate. The pair of side plates each have two apertures through a lower portion and an upper portion thereof. The pair of side plates each have two apertures through a lower portion and upper portion thereof. The pair of side plates are positioned outside of the mounting bracket tab with a pair of bolts extending through the two apertures in the upper portion and through the mounting bracket tab and mounting block for coupling theretogether. The device includes a pair of rollers each having an aperture therethrough. Each of the rollers have recessed end portions. Each of the recessed end portions have a ball bearing washer disposed therein. The pair of rollers are positioned between the pair of side plates with the aperture therethrough aligned with the two apertures in the lower portion of the pair of side plates. A pair of axle bolts extend through the pair of side plates and the pair of rollers and coupled therewith by a pair of nuts.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved motorcycle roller chain guide which has all the advantages of the prior art tensioning devices and none of the disadvantages.

It is another object of the present invention to provide a new and improved motorcycle roller chain guide which may be easily and efficiently manufactured and marketed.

It is a further object of the present invention to provide a new and improved motorcycle roller chain guide which is of durable and reliable construction.

An even further object of the present invention is to provide a new and improved motorcycle roller chain guide which is susceptible of a low cost of manufacture with regard to both materials and labor, and which accordingly is then susceptible of low prices of sale to the consuming public, thereby making such a motorcycle roller chain guide economically available to the buying public.

Still yet another object of the present invention is to provide a new and improved motorcycle roller chain guide which provides in the apparatuses and methods of the prior art some of the advantages thereof, while simultaneously overcoming some of the disadvantages normally associated therewith.

Even still another object of the present invention is to provide a new and improved motorcycle roller chain guide for allowing a chain of a motorcycle to roll to provide more power to a rear wheel thereof.

Lastly, it is an object of the present invention to provide a new and improved motorcycle roller chain guide including a mounting block. A pair of side plates are securable to the mounting block. A pair of rollers each are positioned between the pair of side plates. The pair of rollers serve to engage a motorcycle to aid in powering a rear wheel of the motorcycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein.

The same reference numerals refer to the same parts through the various Figures.

DESCRIPTION OF THE PREFERRED EMBODIMENT

Figure 1:
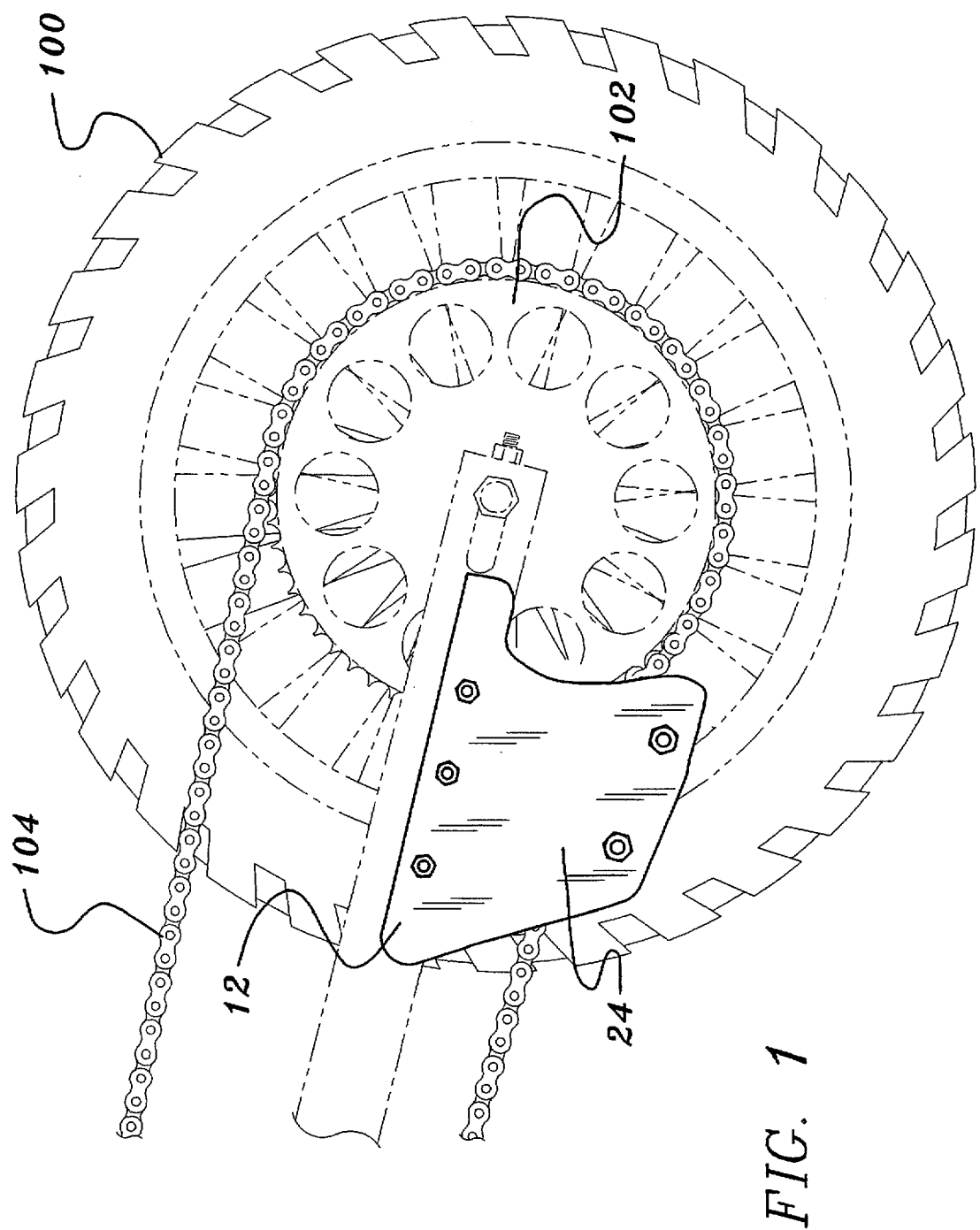
FIG. 1 is a perspective view of the preferred embodiment of the motorcycle roller chain guide constructed in accordance with the principles of the present invention.
Figure 2:
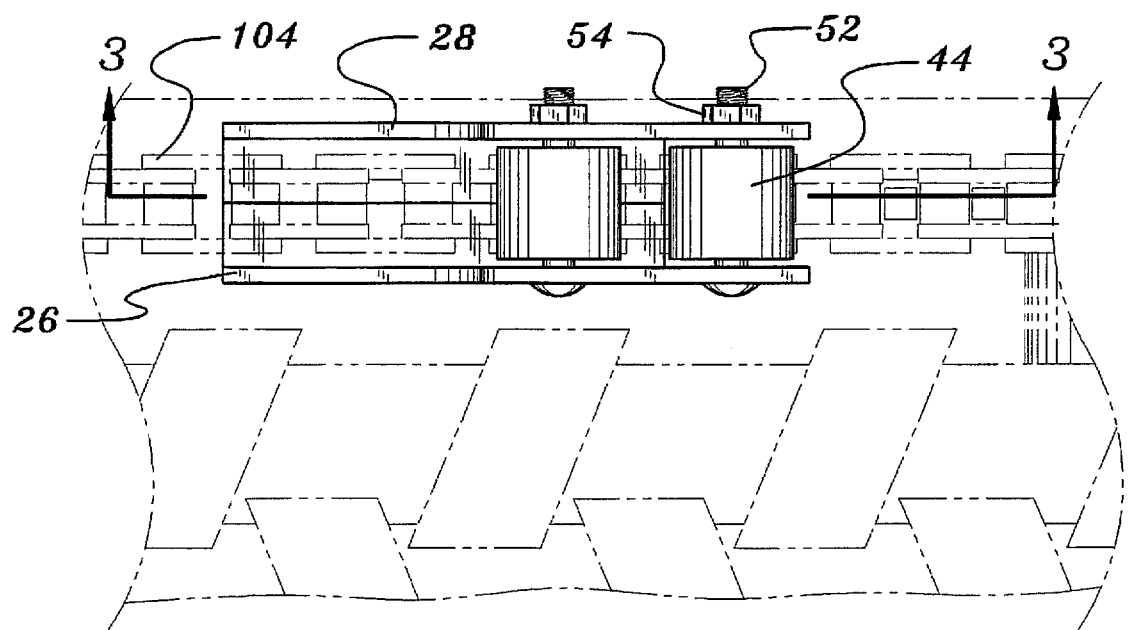
FIG. 2 is a bottom view of the preferred embodiment of the present invention, along line 3—3 FIG. 2.
Figure 3:
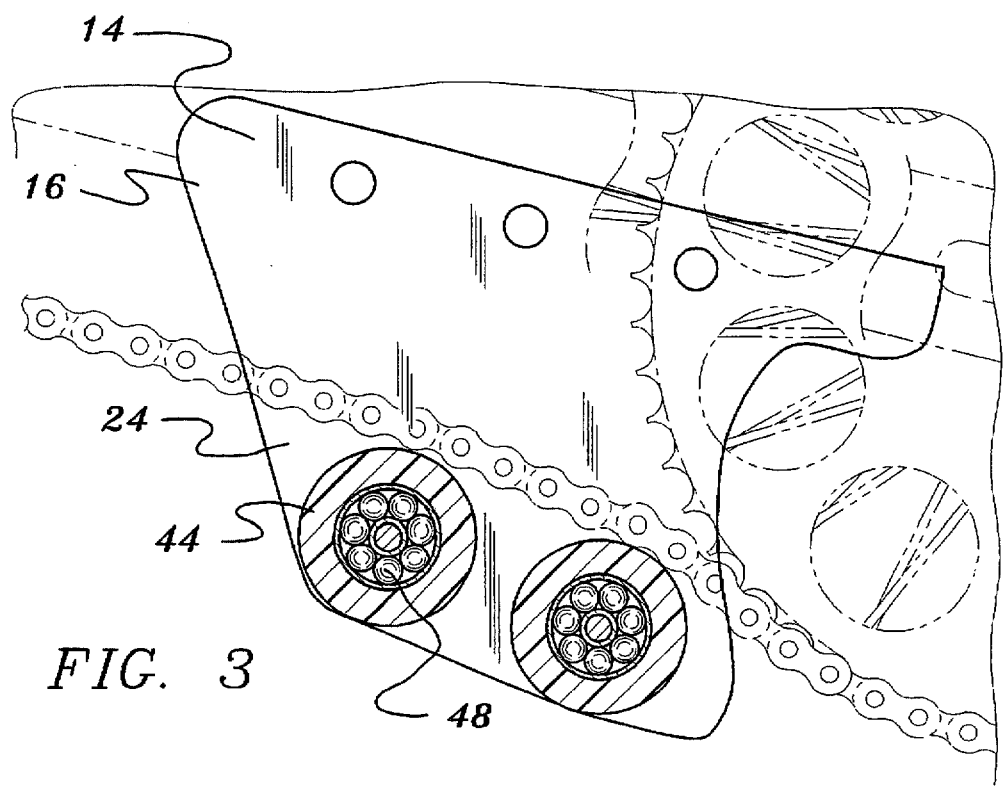
FIG. 3 is a cross-sectional view as taken
Figure 4:
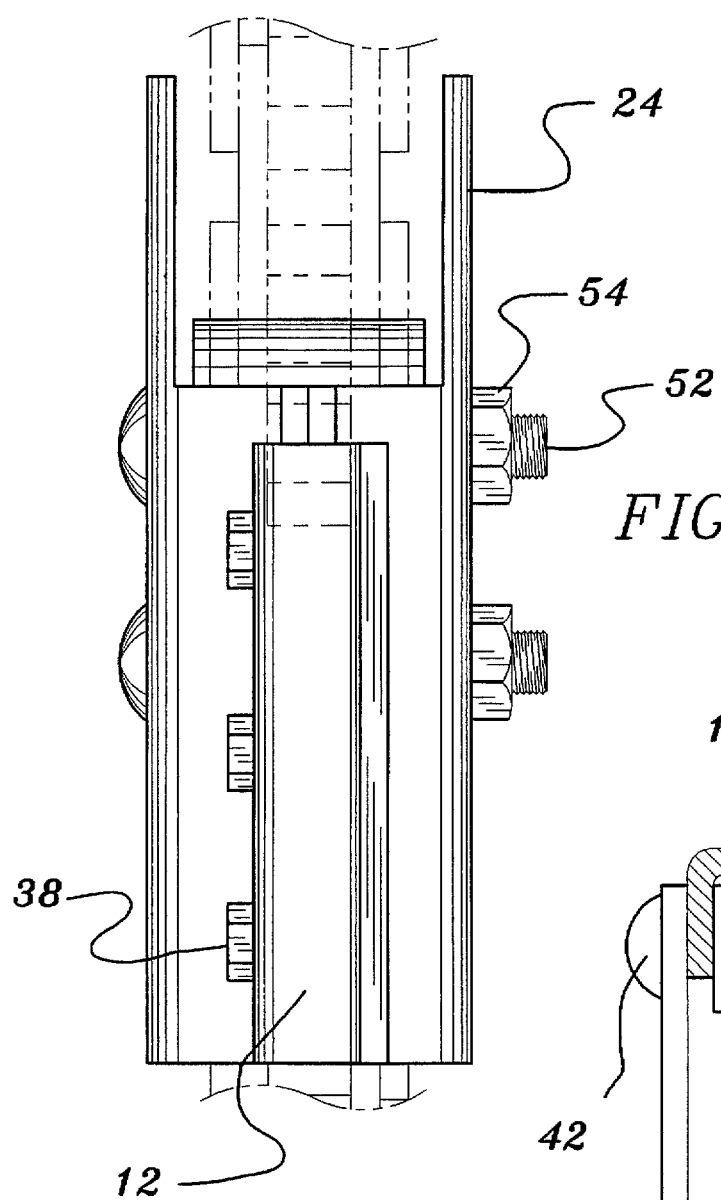
FIG. 4 is a plan view of the preferred embodiment of the present invention.
Figure 5:
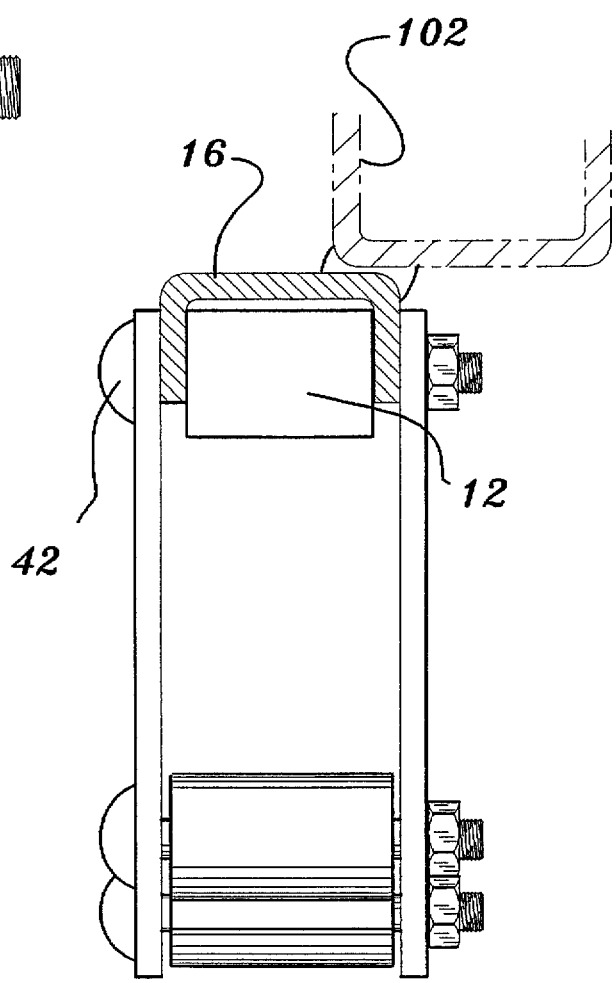
FIG. 5 is a front elevation view of the present invention.
Figure 6:
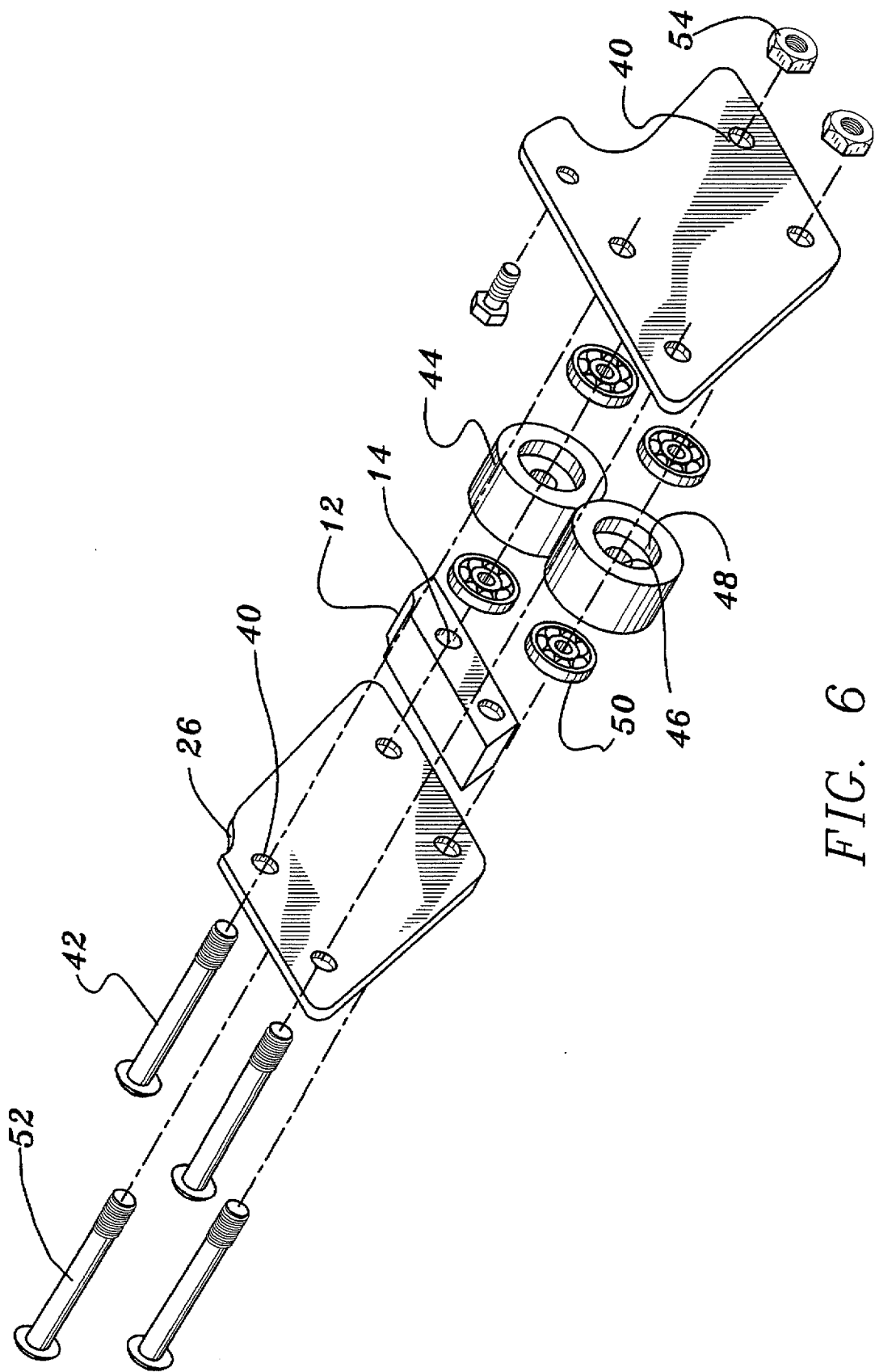
FIG. 6 is an exploded perspective view of the present invention.

With reference now to the drawings, and in particular, to FIGS. 1–6 thereof, the preferred embodiment of the new and improved motorcycle roller chain guide embodying the principles and concepts of the present invention and generally designated by the reference number 10 will be described.

Specifically, it will be noted in the various Figures that the device relates to a new and improved motorcycle roller chain guide for allowing a chain of a motorcycle to roll to provide more power to a rear wheel thereof. In its broadest context, the device consists of a mounting block, a pair of side plates, and a pair of rollers. Such components are individually configured and correlated with respect to each other so as to attain the desired objective.

The device 10 includes a mounting block 12. The mounting block 12 has a pair of apertures 14 therethrough. The mounting block 12 is fabricated of a hard rubber material to absorb upward chain slap. The mounting block 12 is positionable within a mounting bracket tab 16 that is secured to a motorcycle swing arm 102.

Next, the device 10 includes a pair of side plates 24 comprised of an inner plate 26 and an outer plate 28. The pair of side plates 24 each have two apertures 40 through a lower portion and upper portion thereof. The pair of side plates 24 are positioned outside of the mounting bracket tab 16 with a pair of bolts 42 extending through the two apertures 40 in the upper portion and through the mounting bracket tab 16 and mounting block 12 for coupling theretogether. The pair of side plates 24, once they are secured to the mounting block 12, capture the motorcycle chain 104 therebetween allowing for the chain 104 to pass safely therethrough.

Lastly, the device 10 includes a pair of rollers 44 each having an aperture 46 therethrough. Each of the rollers 44 have recessed end portions 48. Each of the recessed end portions 48 have a ball bearing washer 50 disposed therein. The ball bearing washer 50 facilitates the rotation of the rollers 44. The pair of rollers 44 are positioned between the pair of side plates 24 with the aperture 46 therethrough aligned with the two apertures 40 in the lower portion of the pair of side plates 24. A pair of axle bolts 52 extend through the pair of side plates 24 and the pair of rollers 44 and coupled therewith by a pair of nuts 54. The pair of rollers 44 engaging the motorcycle chain 104 to facilitate the passage of the chain 104 through the pair of side plates 24. The pair of rollers 44 allow more power to reach a rear wheel of the motorcycle 100. The device 10 will also increase fuel efficiency and protect the rear sprocket of the motorcycle 100 from impact. The device 10 would be used to replace existing slider blocks on motorcycles which only prevent the chain from becoming disengaged from the chain drive. The slider blocks do not facilitate the passage of the chain therethrough.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A motorcycle roller chain guide for allowing a chain of a motorcycle to roll to provide more power to a rear wheel thereof comprising, in combination:

a mounting block comprised of a vertical planar upper end and a vertical planar lower end, the vertical planar upper end and the vertical planar lower end being coupled together by a horizontal planar member, the vertical planar upper end securable to a chassis of a motorcycle adjacent to a chain drive thereof, the vertical planar lower end having three apertures formed therethrough;

a pair of side plates comprised of an inner plate and an outer plate, the pair of side plates having inwardly extending bracket portions integral with upper edges thereof, the bracket portions having upwardly extending extents, the upwardly extending extents having three apertures therethrough, the three apertures of the upwardly extending extents of the inner plate and the outer plate aligning with the three apertures of the vertical planar lower end of the mounting block for securement together by three nuts and bolts, the pair of side plates each having two apertures through a lower portion thereof, whereby the pair of side plates capture the chain of the motorcycle therebetween allowing for the chain to pass safely therethrough;

a pair of rollers each having an aperture therethrough, each of the rollers having recessed end portions, each of the recessed end portions having a ball bearing washer disposed therein, the pair of rollers positioned between the pair of side plates with the aperture therethrough aligned with the two apertures in the lower portion of the pair of side plates, a pair of axle bolts extend through the pair of side plates and the pair of rollers and coupled therewith by a pair of nuts, whereby the pair of rollers engage the motorcycle chain to facilitate the passage of the chain through the pair of side plates thereby allowing more power to reach the rear wheel of the motorcycle and further increase fuel efficiency.

* * * * *